Sept. 28, 1965  J. F. MORSE  3,208,300
STEERING AND MOTION TRANSMITTING MECHANISM
Filed Sept. 20, 1962  8 Sheets-Sheet 1

INVENTOR.
JOHN F. MORSE
BY Hamilton & Cook
ATTORNEYS

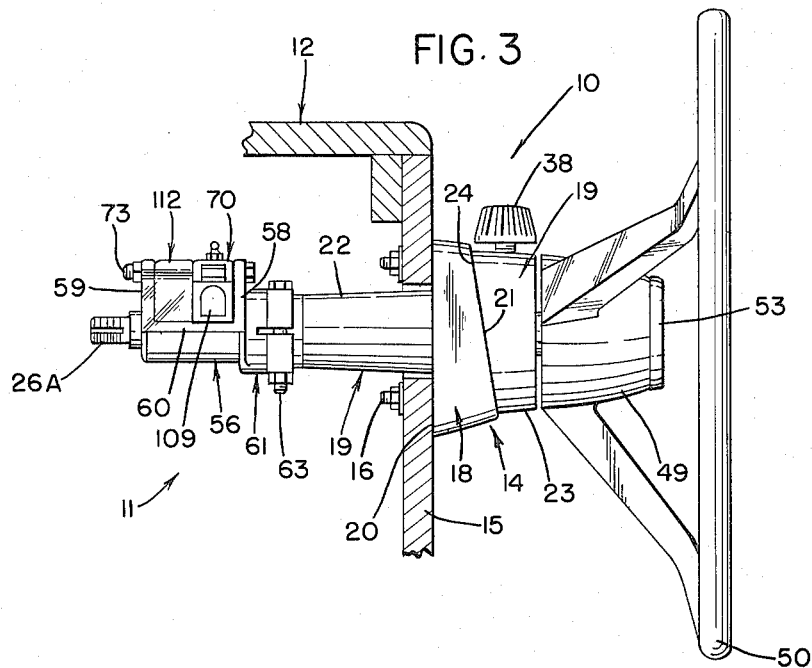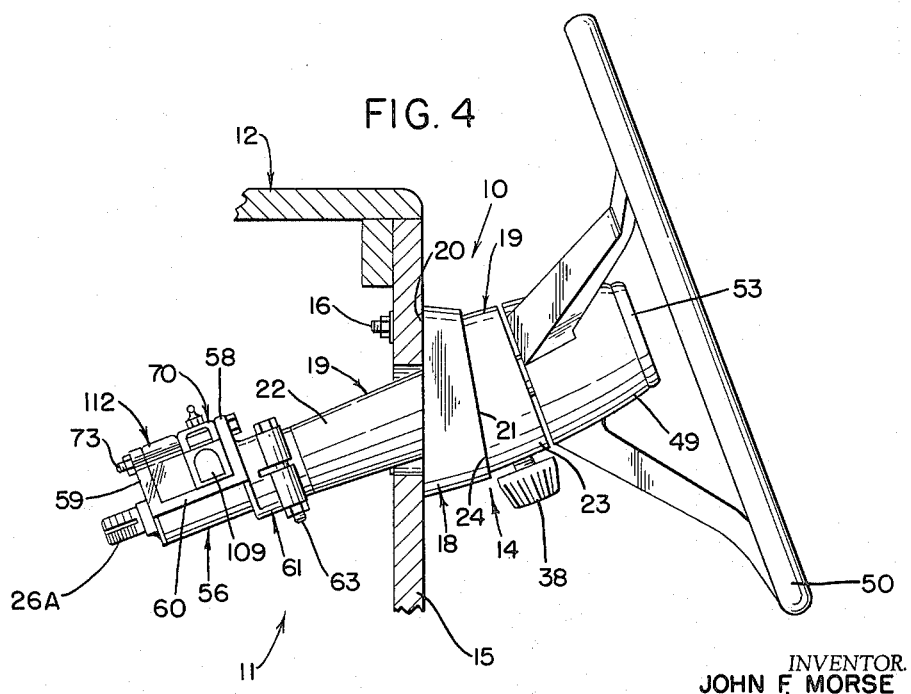

Sept. 28, 1965  J. F. MORSE  3,208,300
STEERING AND MOTION TRANSMITTING MECHANISM
Filed Sept. 20, 1962  8 Sheets-Sheet 3
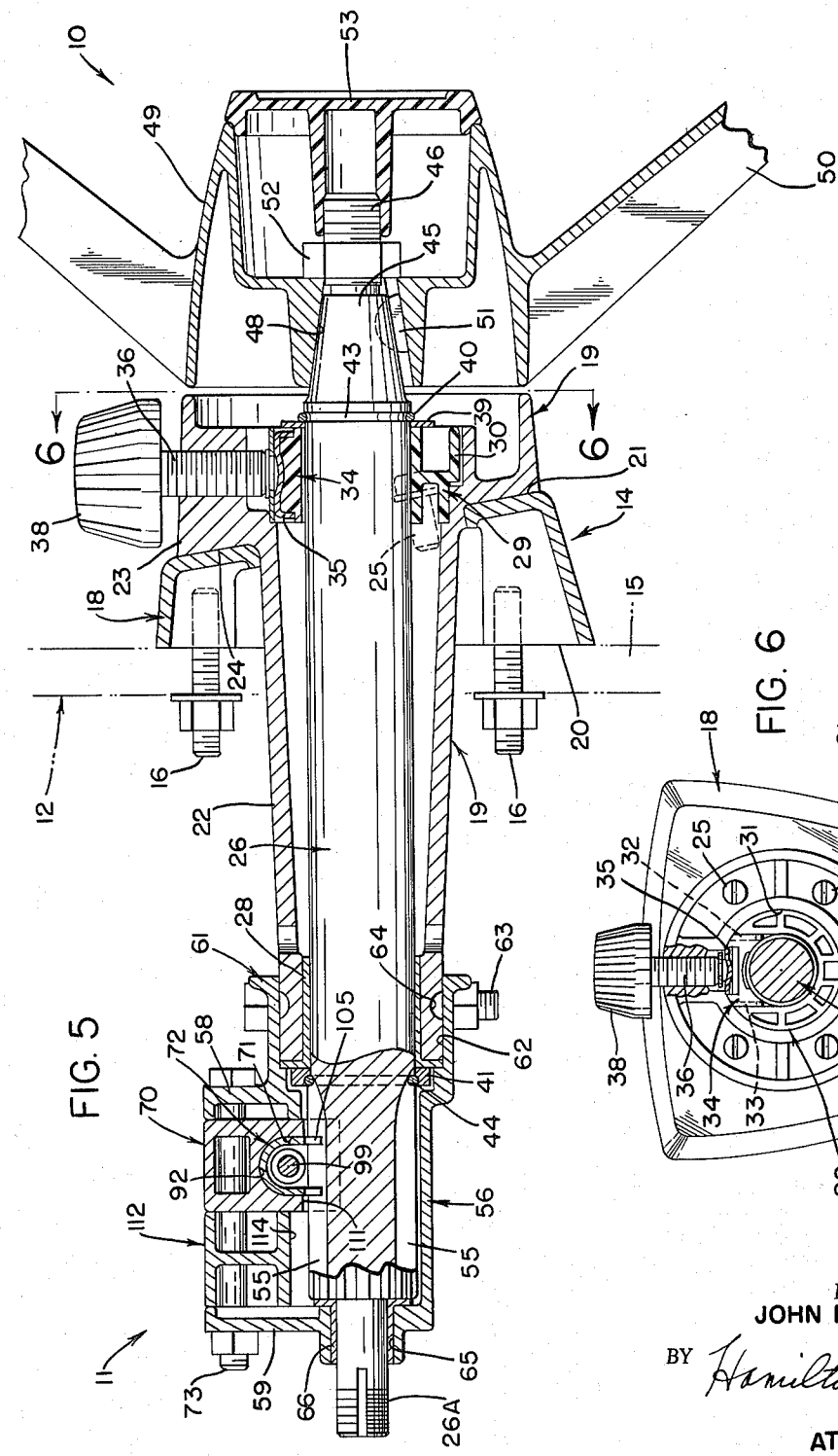
INVENTOR.
JOHN F. MORSE
BY Hamilton & Cook
ATTORNEYS Sept. 28, 1965   J. F. MORSE   3,208,300
STEERING AND MOTION TRANSMITTING MECHANISM
Filed Sept. 20, 1962   8 Sheets-Sheet 4
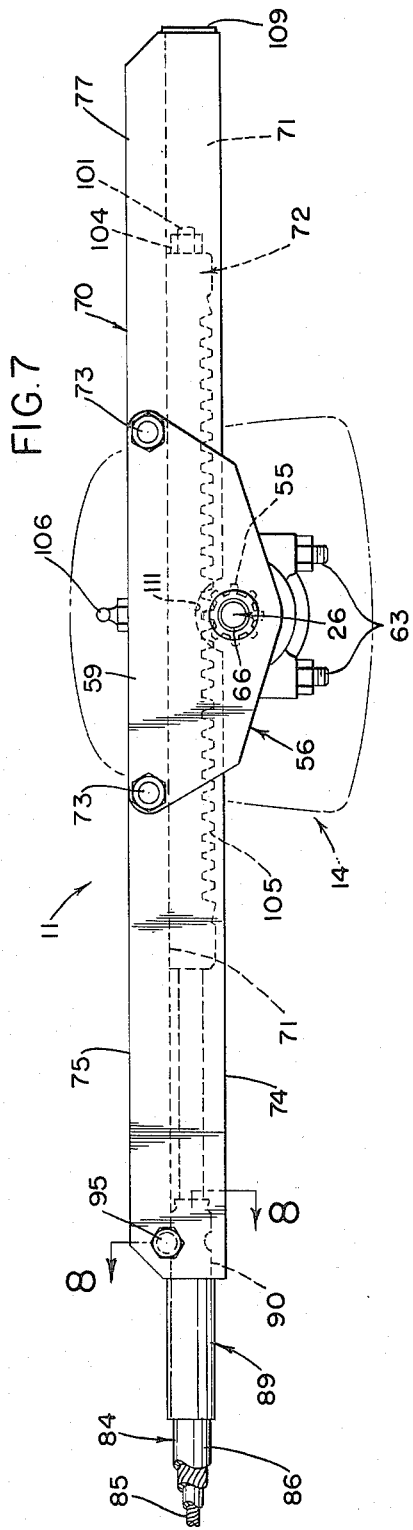
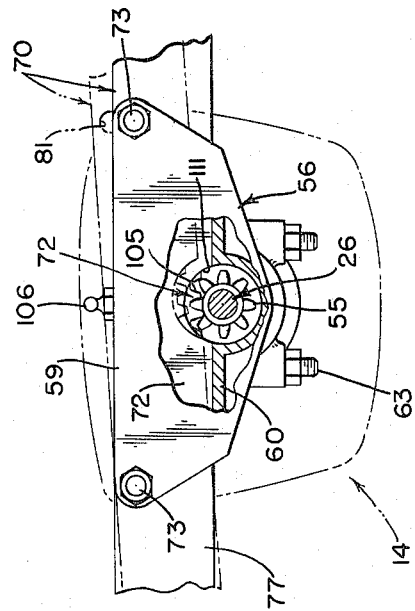
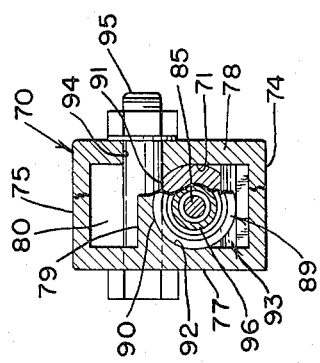
INVENTOR.
JOHN F. MORSE
BY *Hamilton & Cook*
ATTORNEYS

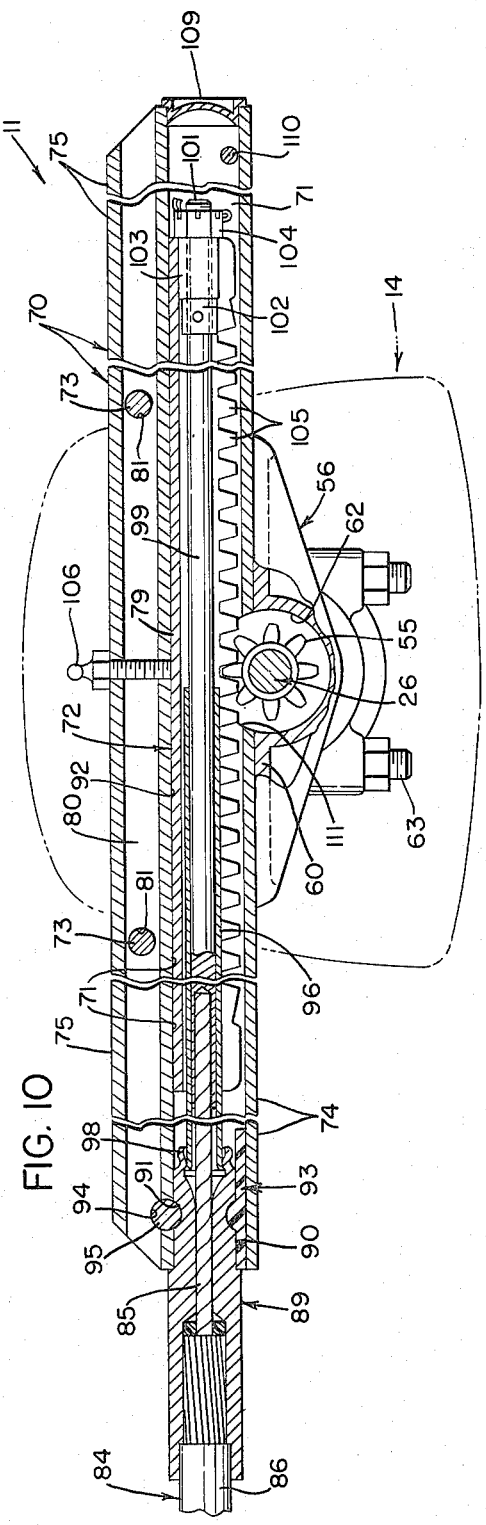

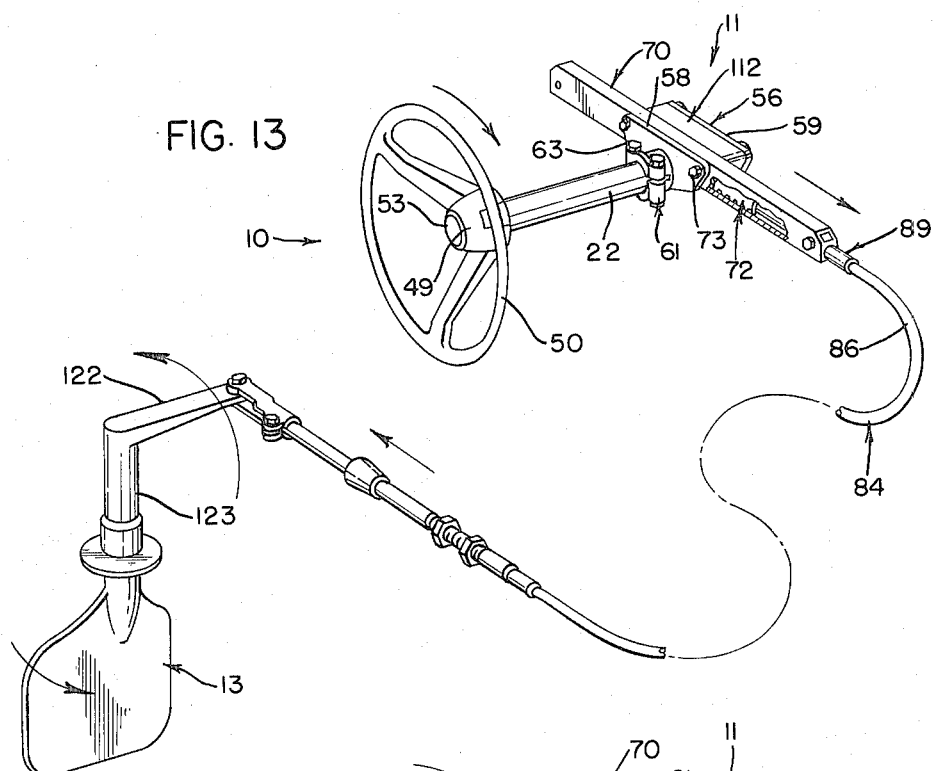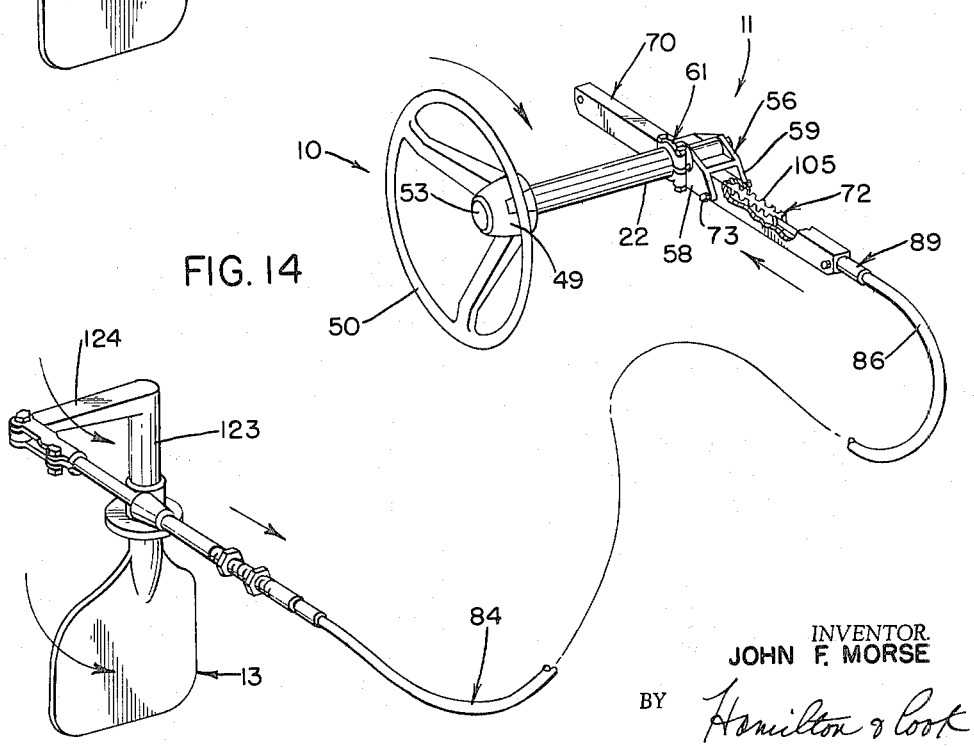

Sept. 28, 1965  J. F. MORSE  3,208,300
STEERING AND MOTION TRANSMITTING MECHANISM
Filed Sept. 20, 1962  8 Sheets-Sheet 7
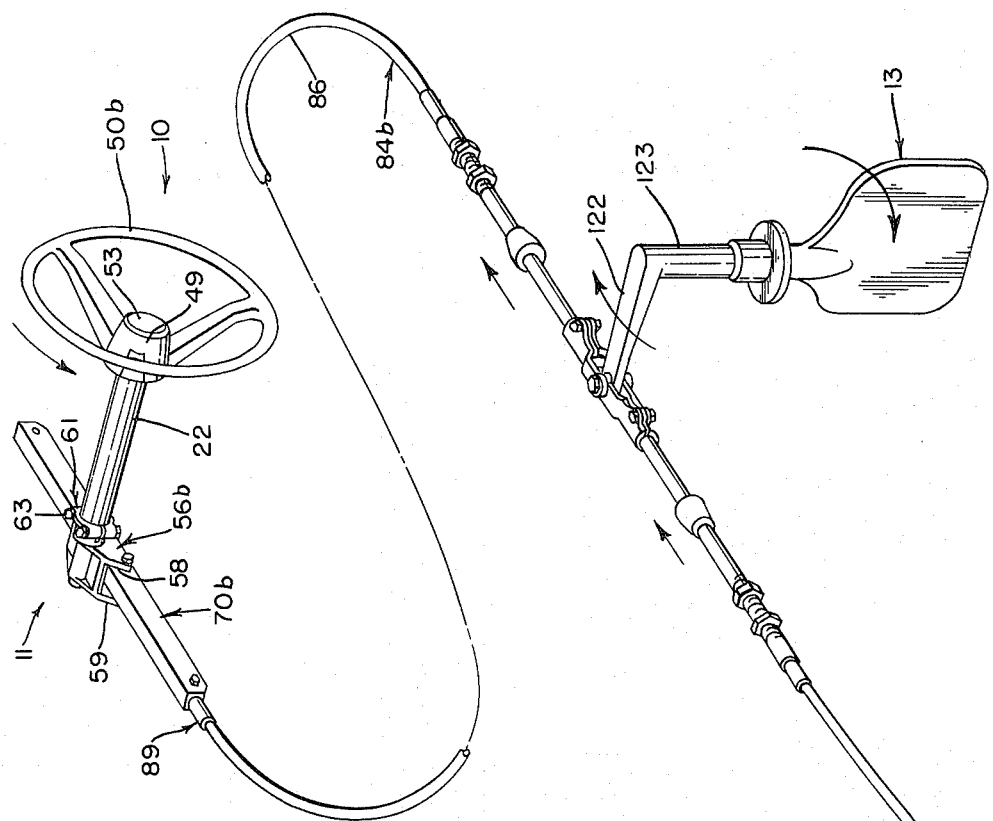
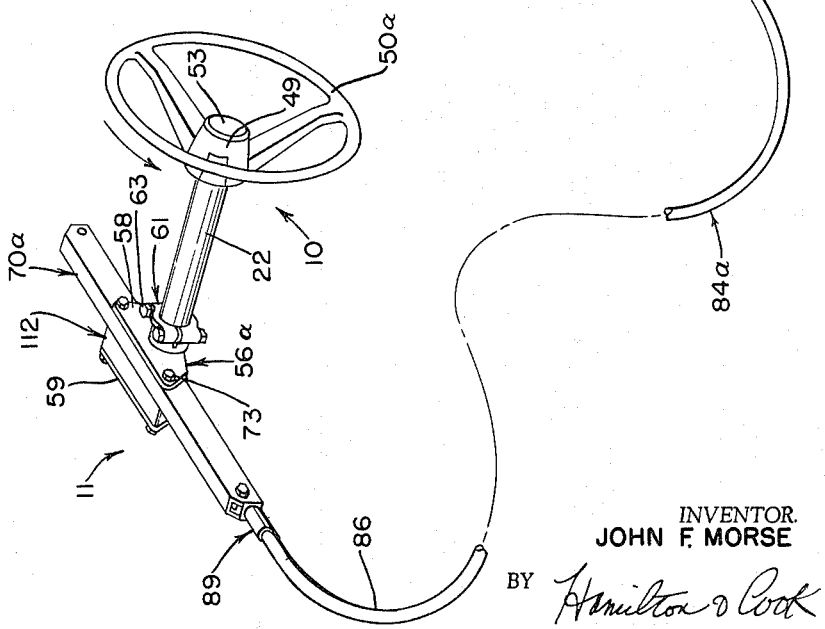
FIG. 15
INVENTOR.
JOHN F. MORSE
BY Hamilton & Cook
ATTORNEYS

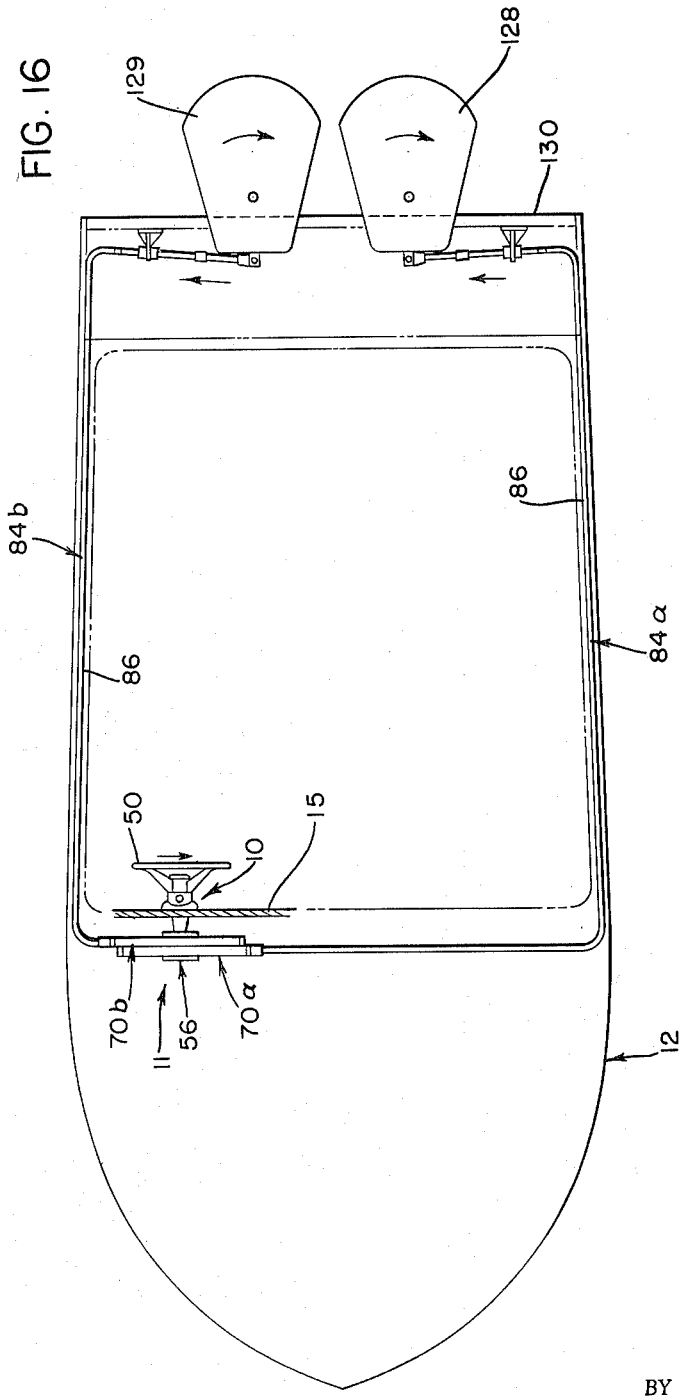

United States Patent Office 3,208,300
Patented Sept. 28, 1965

3,208,300
STEERING AND MOTION TRANSMITTING
MECHANISM
John F. Morse, 21 Clinton St., Hudson, Ohio
Filed Sept. 20, 1962, Ser. No. 225,088
7 Claims. (Cl. 74—498)

The present invention relates generally to steering mechanisms. More particularly, the present invention relates to an improved steering and motion transmitting mechanism employing a rack and cable assembly together with a steering head assembly for actuating a push-pull control cable to transmit mechanical motion. Specifically, the present invention relates to an improved steering mechanism employing assemblies, as above, which are particularly suitable for single and twin outboard, outdrive and small inboard marine installations.

Marine steering assemblies for years have conventionally utilized rope and pulley or other "balanced" remote control systems. "Balanced" remote control systems are almost as old as ships themselves and, when used as steering mechanisms, have traditionally comprised a wheel and shaft with a rope drum to provide the required movement of the rope necessary to operate the rudder or other controllably driven components. The appellation "balanced system" appears quite appropriate when it is realized that the mechanical motion transmitting ropes or cables form a closed system because of their inability to relay mechanical motion by other than tensile stresses.

These balanced systems are still widely used. However, they are quite bulky and cumbersome, and misalignment between the guiding pulleys, rope drum, rudder tiller, or any of the other components can cause excessive binding and wear to the system.

The advent of the push-pull control cable, an example of which can be found in the applicant's prior U.S. Patent No. 3,013,443, provided in a single cable the necessary structure for effecting remote control by the application of either tensile or compressive forces. The push-pull cable thus provided a transfer device which overcomes the difficulties incident to balanced systems, and is particularly easy to install in a conventional boat either during or after construction of the boat, without requiring specialized engineering or mechanical ability.

Actuation of the core of the push-pull cable, however, required something more than the prior rope drum of the balanced system, and complex steering heads have been developed to translate the rotative motion of the steering wheel into the linear motion of the push-pull control cable core. One of the principal disadvantages of these prior art steering heads is that they require more or less complete disassembly of the steering head to install the units and/or to connect the control cable thereto. Moreover, these prior art steering heads are not adapted for a variety of installation requirements.

It is therefore an object of the present invention to provide a steering mechanism that is extremely flexible in application and thus capable of steering by any combination of single or multiple cable runs with any desired directional motion being imparted to the single or multiple cable arrangements.

It is another object of the present invention to provide a steering mechanism as readily adaptable for small or medium size boats, using single or twin inboard or outboard, or outdrive propulsion units which will provide simultaneous steering of two or more remote units by attaching two or more cable assemblies to the standard steering head, without the need for complicated accessories.

It is a further object to provide a steering mechanism which will easily adapt to multiple station steering, as, for example, where a steering station is desired on the flying bridge or tuna tower as well as on the deck or cockpit.

It is a still further object of the present invention to provide a steering mechanism which can be changed to permit ready reversal of the relative directional movement between the wheel and rudder and also to permit ready re-orientation of rudder-to-wheel position, with both a minimum of labor and hull changes.

It is a still further object to provide a steering mechanism which has a readily accessible damping or braking control that can be quickly and variously adjusted to compensate for rudder or outboard torque at different speeds or operating conditions.

It is a still further object to provide a steering mechanism which can be mounted at varying angles with respect to the mounting surface.

It is a still further object to provide a steering mechanism which can be operated by a remote wheel and/or an auto pilot.

These and other objects which will become apparent from the following specification are accomplished by means hereinafter described and claimed.

One preferred embodiment is shown by way of example in the accompanying drawings and described in detail without attempting to show all of the various forms and modifications in which the invention might be embodied, the invention being measured by the appended claims and not by details of the specification.

In the drawings:

FIG. 3 is an enlarged section taken substantially on line 3—3 of FIG. 1 showing the steering mechanism in side elevation.

FIG. 4 is a view similar to FIG. 3 showing an alternative orientation of the steering head assembly.

FIG. 5 is a longitudinal section through the improved steering mechanism.

FIG. 6 is a transverse section taken substantially on line 6—6 of FIG. 5.

FIG. 7 is a rear elevation of a rack and cable assembly used in the improved steering mechanism.

FIG. 8 is an enlarged cross section taken substantially on line 8—8 of FIG. 7.

FIG. 9 is a fragmentary area of FIG. 7, partly broken away, and showing in phantom an adjustment position of the cartridge in the rack and cable assembly with respect to the cartridge support in the steering head assembly.

FIG. 10 is a view similar to FIG. 7, enlarged and in section.

FIG. 11 is a perspective view of a modified cartridge support.

FIG. 12 is a cross section taken substantially on line 12—12 of FIG. 11.

FIG. 13 is a schematic representation of an improved steering mechanism operatively connected to a rudder having a forwardly extending tiller.

FIG. 14 is a schematic representation of an improved steering mechanism operatively connected to a rudder having a rearwardly extending tiller.

FIG. 15 is a schematic representation of dual steering mechanisms operatively attached to a single rudder.

FIG. 16 is a view similar to FIG. 1 showing a single steering mechanism operatively attached to dual outboard engines by dual cable runs.

Figure 1:
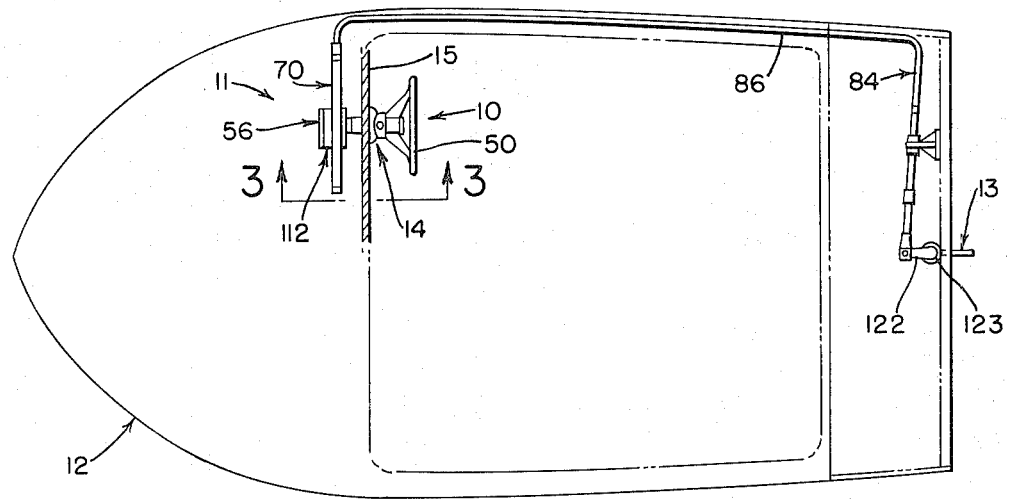
FIG. 1 is a top plan view of a boat employing an improved steering mechanism according to the present invention.
Figure 2:
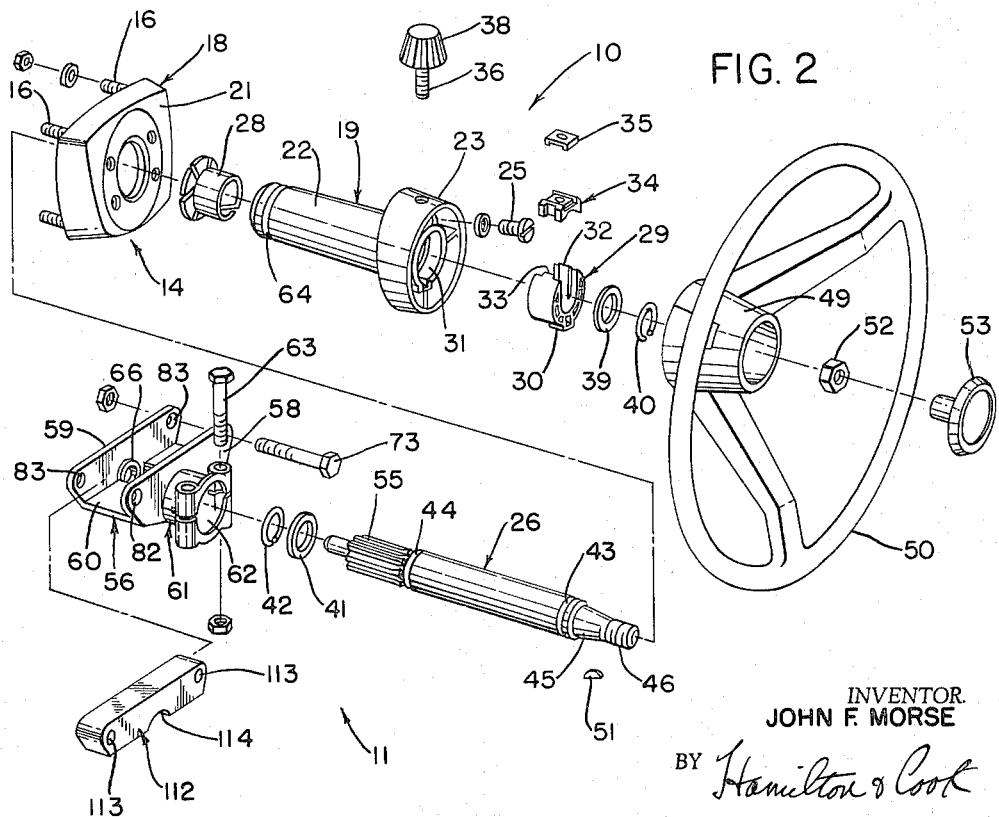
FIG. 2 is an exploded perspective of the steering head assembly of the improved steering mechanism.

In general, a steering mechanism according to the present invention has a steering head assembly operating in combination with a rack and cable assembly.

The steering head assembly utilizes a base means for mounting the assembly to the dash or control panel. A shaft extends through the base means to a cartridge support selectively supported by said base means to effect a selected directional movement to the core of the control cable. Within said cartridge support is a pinion gear means rotatable by said shaft. Operatively connected to the shaft is a wheel drive means for rotating the shaft.

One or more rack cartridges are mounted in said cartridge support. The casing of the push-pull control cable is secured to one end of the cartridge and the core of the control cable is attached to a rack slidable within the rack cartridge. When the rack cartridge is mounted in the cartridge support the rack engages the pinion and the rotational movement of the wheel is translated to axial movement of the cable core.

Turning now to the drawings, the improved steering mechanism has a steering head assembly and one or more rack and cable assemblies, indicated generally in the drawings by the numerals 10 and 11, respectively. The steering mechanism is particularly adaptable for mounting in a boat 12 for remote control of a rudder 13, as shown, for one or more outboard motors.

*Steering head assembly*

The steering head assembly 10 (FIGS. 1-6) has a mounting base portion 14 secured to the dash, or panel, 15 of the boat 12 by a plurality of mounting stud bolts 16. The mounting base portion 14 is generally divisible into a base bracket 18 and shaft housing 19. The mounting bolts 16 extend perpendicularly from the rear face 20 of bracket 18 and the front face 21, which is angularly inclined with respect to the rear face 20, is annularly bored to receive the tubular portion 22 of housing 19. The head portion 23 of housing 19 has a greater diameter than the tubular portion 22 in order to provide a shoulder 24, the plane of which may be angularly inclined to the axis of tubular portion 22. The angular inclination of shoulder 24 is equal to the angular inclination of the front face 21 of bracket 18 against which it abuts so that the tubular portion 22 of the housing 19 can be oriented perpendicularly to the dash 15. Or, if desired, the housing 19 can be rotated by 180° on its axis so that the abutment of shoulder 24 with face 21 provides an angular disposition of the axis of housing 19 with the dash (see FIG. 4). In either event, a plurality of symmetrically disposed machine screws 25 secure the housing 19 onto bracket 18 to form the base portion 14.

A shaft 26 extends through the base portion 14 and is journaled for rotation in bearings 28 and 29. The rear bearing 28 is an annular flanged bearing positioned within the rear end of tubular portion 22, and the front bearing 29 is a horseshoe bearing non-rotatably, as by key 30, housed in an annular receptacle 31 within the head portion 23 of housing 19. Opposed, inwardly directed guides 32 and 33 extend along the sides of the open portion of the horseshoe front bearing 29 tangentially away from the bearing raceway. A brake 34, to assist the helmsman in holding course or overcoming torque loads, is keyed onto guides 32 and 33 for radial movement against and away from shaft 26. A preferably metallic brake plate 35 is carried on the radially outer surface of brake 34 for wear-resistant contact with the brake set 36. Brake set 36 is in the form of a set screw and is depicted as extending from a knurled control knob 38 for easy manual adjustment.

The maintenance of the axial position of shaft 26 is assisted by a front thrust ring 39 in conjunction with a retaining ring 40 and by a rear thrust ring 41 in conjunction with a retaining ring 42. The front and rear retaining rings are seated in annular grooves 43 and 44, respectively, on shaft 26 in a conventional manner.

The end of shaft 26 to which the steering means attaches has a tapered portion 45 which reduces the diameter of the main portion of the shaft to a cylindrical threaded portion 46. The conical inner surface 48 of the hub portion 49 of wheel 50 seats on the tapered portion 45 and is non-rotatably secured thereto, as by a key 51. A retaining nut 52 screws onto the threaded portion 46 and maintains the wheel 50 against axial displacement relative to shaft 26. A hub cover 53 may be provided to decorate the open end of the hub portion 49. The shaft 26 may be driven with equal facility by a remote wheel operatively connected thereto by a chain and sprocket or other suitable arrangement (not shown).

The other end of shaft 26 is either provided with teeth 55 to constitute a pinioned portion, as shown, or may be non-rotatably connected to an independent pinion gear. The toothed pinion portion of shaft 26 extends outwardly of the housing 19 and into a cartridge support 56. An extension 26A may be provided beyond the pinioned portion of shaft 26 for mounting another wheel, auto pilot or remote steering station.

Cartridge support 56 is in the form of a yoke defined by two spaced-apart and parellel wing plates 58 and 59 which are joined by a spacer wall, or connector backing plate, 60. A bifurcated clamp lock 61 extends outwardly from wing plate 58 in a direction opposite from backing plate 60 and has an annular bore 62 therethrough adapted rotatably to engage the end of the tubular portion 22 of housing 19 opposite the head portion 23. A pair of clamping bolts 63 extend between the bifurcated ends of clamp lock 61 to tighten the clamp lock against the tubular portion of the housing for selective non-rotational positioning of the cartridge support 56. Clamping bolts 63 are spaced at a lesser distance than the outer diameter of bore 62 in order to be received in an annular groove 64 in the outer periphery of the tubular portion 22. This spacing prevents axial displacement of the cartridge support 56 with respect to housing 19 unless the bolts 63 are completely removed.

Axially aligned with the bore 62 is a bore 65 in wing plate 59. A flanged bearing 66 received in bore 65 journals the innermost end of shaft 26 to give support to the pinioned portion.

*Rack and cable assembly*

The rack cartridge 70 (FIGS. 7-9) has a rectilinear cross section with a guideway 71 therethrough for slidably receiving a rack 72. The cartridge 70 also has a portion remotely of the guideway 71 through which mounting bolts 73 can mountably attach the cartridge 70 to cartridge support 56.

The cross section of the embodiment shown may be readily extruded to provide bottom and top walls 74 and 75 rectangularly intersecting side walls 77 and 78. A medial partition 79 also extends between the side walls 77 and 78 in generally parallel disposition with the bottom and top walls 74 and 75. Medial partition 79 divides the interior of cartridge 70 into two compartments, one of which is the arch-like guideway 71 and the other is the dead space 80 through which fastening bolts 73 can pass without entering guideway 71. Side walls 77 and 78 are bored, as at 81 (FIG. 10), to accommodate bolts 73 and are in register with bores 82 and 83 (FIG. 2) in the wing plates 58 and 59, respectively.

Referring particlularly to FIGS. 7 and 10, a push-pull cable 84, or other suitable motion-transmitting means, is operatively connected at one end of the cartridge 70. Push-pull cable 84 has a core element 85 slidable in a casing 86 to transmit mechanical motion. One end of an end fitting 89 is swaged onto the casing 86 of the control cable 84, and the other, or interfitting, end 90 is fastened to the cartridge 70. The interfitting end portion 90 of the end fitting 89 is cylindrical, with an annular intermediate groove 91. The cylindrical contour of end 90 is coincident with the arched, or rounded, portion 92 (FIG. 8) of guideway 71 and thus embraces one-half the circumference thereof. A filler block 93 engages the remaining half of the radially outer side of end 90 and also seats against the bottom wall 74 of cartridge 70 to support the end portion 90.

A bore 94 is provided transversely between the side walls 77 and 78, cutting the medial partition 79, so that a removable locking bolt 95 positioned therein will extend across the arched portion of the guideway 71 sufficiently to seat in annular groove 91 in the end fitting 89. Bolt 95 thus locks the cable casing securely against axial movement with respect to the cartridge 70 but permits free rotation of the casing and end fitting in the end of the cartridge.

An extension tube 96 is swivelly mounted in the fitting 89, as by the socket arrangement 98. An end rod 99, which is connected to the end of the core element 85, is slidably received in extension tube 96. The extension tube 96 is closely fitted around end rod 99 to guide the rod 99 and prevent excessive deflection of that portion of the core element 85 sliding therein when subjected to compressive forces.

The rack 72 is attached to the end of rod 99. The rack may be made in any of a number of ways. However, the rack 72 is shown as being a sheet metal stamping having a U-shaped cross section to overlie the extension tube 96 and end rod 99.

To connect the rack 72 to the end rod 99, the outermost end of rod 99 has a threaded portion 101 terminating in a shoulder 102. The threaded portion 101 extends through a bushing 103 secured to the rack 72 and the shoulder 102 abuts against bushing 103. A lock nut 104 on threaded portion 101 completes the connection.

The curved portion of the U-shaped rack 72 slidably engages the arched portion 92 of guideway 71 and the leg portions of the rack extend along side walls 77 and 78 toward the bottom wall 74. The extremity of the leg portions of the U-shaped rack 72 are provided with a series of teeth 105 for selective engagement with the teeth 55 on the pinioned portion of shaft 26.

A lubricating connection 106 communicates with guideway 71 to provide the necessary lubrication for the sliding of rack 72 therein.

A sealing insert 109 is provided at the end of the guideway 71 opposite the end fitting 89 to preclude entry of any water, dirt, or other deleterious matter. A stop pin 110 is placed inwardly of insert 109 to provide a stop for rack 72.

A section of the bottom wall 74 and an arcuate portion of the side walls 77 and 78 contiguous therewith are removed to provide a lateral gear entry 111 (FIG. 9). Gear entry 111 is positioned medially of the ends of cartridge 70 and spacially with respect to bores 81 so that when the cartridge 70 is mounted in cartridge support 56 the pinion teeth 55 on shaft 26 are free to engage the teeth 105 on rack 72.

Filler block

As can be best observed in FIGS. 2-5, the parallel wing plates 58 and 59 forming the yoke of cartridge support 56 are preferably spaced apart twice the width of a rack cartridge 70 so that dual cartridges can be mounted in the cartridge support 56 when desired. When only one rack cartridge is mounted in cartridge support 56, a filler block 112 is used. Filler block 112 is provided with bores 113 to receive mounting bolts 73, and is provided with a recess 114 in which the pinioned portion of shaft 26 can turn without interference.

Universal cartridge support

One form of a universal cartridge support 115 is shown in FIG. 11. This cartridge support differs from cartridge support 56 in that the spacer of connector plate 116 is located to extend between the medial portion of wing plates 118 and 119 so that opposed yoke portions 120 and 121 are formed. Shaft 26' extends perpendicularly between wing plates 118 and 119 along and through the spacer plate 116 so that the pinioned portion of shaft 26' will turn in both yoke portions 120 and 121, simultaneously. In the embodiment shown, wing plates 118 and 119 are spaced apart only sufficiently to mount one rack cartridge 70 therebetween on each side of spacer plate 116. However, the wing plates may readily be spaced apart the width of two cartridges for side-by-side mounting of cartridges with a filler block being used when mounting only one cartridge.

Operation

The steering mechanism of the present invention is operatively connected to the rudder, outboard motor, or other controllable device by a push-pull control cable. In the FIG. 1 representation, the control cable 84 extends rearwardly along the starboard side of the boat and attaches to the forwardly extending tiller 122 of rudder 13. This connection is depicted in schematic perspective in FIG. 13. It will be noted that the rack cartridge 70 is mounted with the yoke of the cartridge support 56 facing upwardly. In this disposition, a clockwise rotation (arrows show direction on drawing) of the wheel 50 turns to pinioned shaft to drive the rack 72 to starboard, thus applying a compressive force onto the cable core. This motion of the cable core imparts a counterclockwise rotation to the tiller 122 about its shaft 123 (as viewed from above). This connection will turn the boat to the starboard with a clockwise rotation of wheel 50.

However, one or the other of two conditions might exist which would materially alter the situation. First, the rudder 13 might be provided with an aft extending tiller, or the configuration of the boat might require that the control cable 84 extend along the port side. In either event, proper coordination of wheel and rudder can easily be accomplished by inverting the cartridge support. For example, in FIG. 14 the rudder 13 is represented as having a rearwardly or aft extending tiller arm 124, and the control cable 84 is positioned along the starboard side of the boat. The coordination of rudder-to-wheel direction can be obtained simply by positioning the cartridge support 56 with the yoke forming wings 58 and 59 extending downwardly. The cartridge support 56 can be easily thus oriented by loosening bolts 63 sufficiently to release the bifurcated clamp 61 so that the cartridge support 56 can be rotated about the tubular portion 22 of housing 19 and then re-tightening bolts 63 when the desired positioning of the support 56 has been obtained. The rack cartridge 70 is then mounted in the support 56 with the cable connection extending generally to starboard. With this arrangement, a clockwise rotation of wheel 50 applies a tensile stress to the cable core by moving rack 72 generally to port, which in turn rotates the tiller 124 in a counterclockwise manner about rudder shaft 123. This rotation of rudder shaft 123 will move the rudder 13 in the direction necessary to turn the boat to starboard.

In FIG. 15 is depicted a double wheel-single rudder connection. The wheel 50a is located at the deck or cockpit and the wheel 50b may be located in a remote location, such as the tuna tower or flying bridge.

The rudder 13 is provided with a forwardly extending tiller arm 122. Control cable 84a is positioned to lie along the port side of the boat and connects the tiller 122 with a rack cartridge 70a mounted in cartridge support 56a. This type tiller together with the positioning of the control cable 84 requires that the yoke of the cartridge support 56a face upwardly, as shown.

Cable 84b, which leads from the second steering location, is depicted as running toward the tiller 122 from the starboard side of the boat. In order to have complete directional coordination between both wheels of the rudder, the cartridge support 56b must have the yoke face downwardly so that a counterclockwise rotation of wheel 50b will actuate the rudder in exactly the same direction as a counterclockwise rotation of wheel 50a.

The rudder can be controlled by either wheel 50a or 50b merely by permitting the other wheel to rotate freely.

When dual cartridges are mounted in support 56 they may be mounted so that both cable connections are on the same side or so that the cables connect on opposite sides. Moreover, the available connections may be multiplied, depending upon whether the yoke of the cartridge support faces generally upwardly or downwardly, and even further combinations are available by the use of a universal cartridge support such as shown in FIG. 11 (either single or double width).

One last example is shown in FIG. 16 wherein twin outboard motors 128 and 129 are mounted on the transom 130 of a boat 12. Previously, when twin outboard motors were steered by a push-pull control cable and a wheel, the cable had to be connected to one motor with a rigid tie rod connecting the two motors together. Or, if a double cable connection were attempted, a double steering head had to be supplied which could be interconnected with a single wheel. The objections to the latter construction are obvious on its face. The major drawbacks to the former construction are that the tie rod frequently jammed when tilting only one motor at a time and that the single cable does not provide the desired factor of safety provided by a twin cable.

By the use of a steering mechanism according to the present invention, the twin motors 128 and 129 are operated by twin cables 84a and 84b from a single steering head assembly 10. Control cable 84a extends along the port side of the boat to connect motor 128 to rack cartridge 70a, and the control cable 84b extends along the starboard side of the boat to connect the motor 129 to the rack cartridge 70b.

Control cable 84a is secured in the port side of cartridge 70a and cable 84b is secured in the starboard side of cartridge 70b. Both cartridges 70a and 70b are mounted in cartridge support 56 which is oriented with the yoke forming wing plates 58 and 59 extending upwardly. Thus, when the wheel 50 is rotated in either direction, both motors 128 and 129 are turned in a coordinated direction.

Adjustments in the orientation of the individual motors or the orientation of the wheel spokes can be rather easily accommodated by the present steering mechanism. In all previous steering mechanisms it was necessary to almost completely disassemble the steering head in order to change the relationship between the components in order to re-orient the rudder or motor to wheel position. This re-orientation is simply accomplished in the present steering mechanism by merely removing one of the mounting bolts 73 and tilting the rack cartridge 70 about the pivot of the remaining mounting bolt 73 sufficiently to disengage the teeth 105 of rack 72 and the teeth 55 of the pinion portion of shaft 26, as shown in phantom in FIG. 9. The wheel, motor or rudder can then be turned independently to establish the desired orientation, the rack and pinion re-engaged, and the mounting bolt 73 replaced.

By connecting the rack cartridge with the desired size of control cable, the steering mechanism of the present invention can be readily adapted to the steering systems of a large variety of boat sizes requiring steering mechanisms of different strengths and capacities. Furthermore, rack cartridges can be inserted, removed, and/or replaced without any disassembly of the steering head assembly. On the other hand, in prior known steering mechanisms connecting or disconnecting the cable of the steering mechanism required the removal of grease coated bearings, gears, etc., that were easily dropped into the bilge and thus became contaminated with abrasives.

Moreover, the multiplicity of connections available from a steering mechanism constructed according to the concept of the present invention will meet any known marine steering requirements and otherwise accomplish the objects of the invention.

What is claimed is:
1. A steering head assembly comprising, a base means for mounting said steering head assembly, a tubular portion attached to and extending outwardly from said base means, a shaft journaled in said tubular portion, a cartridge support forming a yoke, an attaching means, said cartridge support carried on said tubular portion by said attaching means, said attaching means being adjustable to permit selective invertible mounting of the yoke formed by said cartridge support on said tubular portion, a pinion means rotatable in the yoke of said cartridge support by said shaft, and drive means for selectively rotating said shaft.

2. A steering head assembly comprising, a base means for mounting said steering head assembly, a tubular portion attached to and extending outwardly from said base means, a shaft journaled in said tubular portion, a cartridge supporting yoke formed by spaced apart wing plates, an attaching means, said wing plates carried on and oriented transversely with respect to said tubular portion by said attaching means, said attaching means being adjustable to permit selective invertible mounting of the wing plates about said tubular portion, a pinion means totatable between said wing plates by said shaft, and drive means for selectively rotating said shaft.

3. A steering head assembly comprising, a base means for mounting said steering head assembly, said base means having a tubular portion extending outwardly from one side thereof, a cartridge support, an attaching means, said support cartridge carried on said tubular portion by said attaching means and having spaced apart wing plates oriented generally transversely of said tubular portion and forming a yoke, said attaching means being adjustable to permit selective invertible mounting of the yoke with respect to said tubular portion, a rotatable shaft extending through said base means and tubular portion, a pinion means rotatable between said wing plates by said shaft, teeth on said pinion means, said teeth extending into said yoke, and means for selectively rotating said shaft.

4. A steering head assembly comprising, a base bracket for mounting said assembly, a housing extending through and carried by said base bracket, said housing having a head portion and a tubular portion, said head portion abutting said bracket and demountably attached thereto, a cartridge support, said cartridge support having spaced apart wing plates joined by a spacer wall to form at least one yoke, an attaching means mounted outwardly of one of said wing plates, said cartridge support carried on the end of said tubular portion outwardly of said base means by said attaching means to position said wing plates generally transversely of said tubular portion, said attaching being adjustable to permit selective invertible mounting of the yoke with respect to said tubular portion, a rotatable shaft extending through said base means and tubular portion and secured to rotate a pinion means therewith, said pinion means located within said cartridge support and having teeth thereon extending through said spacer wall and into the yoke medially of said wing plates, and wheel drive means on the other end of said shaft for selectively rotating said shaft, a motion transmitting means and also being engaged with said pinion means when said cartridge is mounted within said cartridge support.

5. A steering head assembly comprising, a base means for mounting said steering head assembly, said base means having a tubular portion extending outwardly from one side thereof, a cartridge support, said cartridge support having spaced-apart wing plates to form at least one yoke, an annularly bored clamp means outwardly from one of said wing plates, said wing plates bored in register with the bore in said clamp means, the clamp means on said cartridge support mounting said cartridge support for selectively invertible positioning on the end of the tubular portion outwardly of said base means, a rotatable shaft extending through said base means and tubular portion, a pinion means rotatable between said wing plates by said shaft, teeth on said pinion means, said teeth extending into said yoke, and means for selectively rotating said shaft.

6. A steering system comprising, a head assembly and at least one rack assembly, said head assembly having a base means for mounting said head assembly, said base means having a tubular portion extending outwardly from one side thereof, attaching means, a cartridge support, said cartridge support mounted on said tubular portion outwardly of said base means by said attaching means, said cartridge support having spaced-apart wing plates forming at least one yoke, said attaching means being adjustable to permit selective invertible mounting of the yoke formed by said cartridge support on said tubular portion, a rotatable shaft extending through said tubular portion, a pinion means rotatable in the yoke of said cartridge support by said shaft, and drive means for selectively rotating said shaft, said rack assembly having a rack cartridge detachably mounted in said cartridge support, a rack means axially slidable in said cartridge, said rack means adapted to be attached to a motion transmitting means and also being engaged with said pinion means when said cartridge is mounted in said cartridge support.

7. A steering system comprising, a head assembly and at least one rack and cable assembly, said head assembly having a base means for mounting said head assembly, said base means having a tubular portion extending outwardly from one side thereof, attaching means a cartridge support, said cartridge support mounted on the end of said tubular portion outwardly of said base means by said attaching means, said cartridge support having spaced-apart wing plates forming at least one yoke, said attaching means being adjustable to permit selective invertible mounting of the yoke formed by said cartridge support on said tubular portion, a rotatable shaft extending through said tubular portion, a pinion means rotatable in the yoke of said cartridge support by said shaft, and wheel drive means on the other side of said base means for rotating said shaft, said rack and cable assembly having a rack cartridge detachably mounted in said cartridge support, the casing of a push-pull cable secured to one end of said rack cartridge, and a rack means axially slidable in said rack cartridge, said rack attached to the core of said control cable, said rack means engaging said pinion means when said cartridge is mounted in said cartridge support.

References Cited by the Examiner
UNITED STATES PATENTS

| | | | |
|---|---|---|---|
| 911,069 | 2/09 | Perkins | 74—498 X |
| 1,843,347 | 2/32 | Steelsmith | 74—422 X |
| 2,026,459 | 12/35 | Caretta | 74—422 X |
| 2,631,469 | 3/53 | Oliver et al. | 74—501 |
| 2,757,553 | 8/56 | Marr | 74—501 X |
| 2,890,595 | 6/59 | Loeffler | 74—498 |
| 2,905,422 | 9/59 | Sacharow | 248—188 |
| 2,926,545 | 3/60 | Loeffler. | |
| 2,985,031 | 5/60 | Bennett | 74—501 X |
| 2,961,986 | 11/60 | Rockhill | 74—498 X |
| 3,010,339 | 11/61 | Brock | 74—571 X |
| 3,059,496 | 10/62 | Jones. | |
| 3,091,977 | 6/63 | Kiekhaefer | 74—501 |

FOREIGN PATENTS
853,933 11/60 Great Britain.

BROUGHTON G. DURHAM, *Primary Examiner*.

UNITED STATES PATENT OFFICE
CERTIFICATE OF CORRECTION

Patent No. 3,208,300 September 28, 1965

John F. Morse

It is hereby certified that error appears in the above numbered patent requiring correction and that the said Letters Patent should read as corrected below.

Column 3, line 22, for "for" read -- or --; column 6, lin 22, for "to", first occurrence, read -- the --; column 8, line 51, after "attaching" insert -- means --; line 60, after "shaft ", second occurrence, insert a period; same line 60, beginning wit ", a motion" strike out all to and including "tridge support." in line 63, same column 8; column 9, line 30, after "means" insert a comma.

Signed and sealed this 18th day of October 1966.

(SEAL)
Attest:

ERNEST W. SWIDER
Attesting Officer

EDWARD J. BRENNER
Commissioner of Patents